United States Patent
Zheng et al.

(10) Patent No.: US 9,244,191 B2
(45) Date of Patent: Jan. 26, 2016

(54) REAL-TIME SYNCHRONOUS MEASURING SYSTEM FOR MULTIPLE FACTORS SUCH AS WIND-BLOWN SAND ELECTRIC FIELD, SAND PARTICLE CHARGING AND WIND SPEED

(75) Inventors: Xiaojing Zheng, Lan Zhou (CN); Tianli Bo, Lan Zhou (CN); Yirui Liang, Lan Zhou (CN)

(73) Assignee: LANZHOU UNIVERSITY, Lanzhou (CN)

( * ) Notice: Subject to any disclaimer, the term of this patent is extended or adjusted under 35 U.S.C. 154(b) by 220 days.

(21) Appl. No.: 14/126,371

(22) PCT Filed: Sep. 2, 2011

(86) PCT No.: PCT/CN2011/001492
§ 371 (c)(1),
(2), (4) Date: Dec. 13, 2013

(87) PCT Pub. No.: WO2012/171148
PCT Pub. Date: Dec. 20, 2012

(65) Prior Publication Data
US 2014/0144227 A1      May 29, 2014

(30) Foreign Application Priority Data
Jun. 13, 2011   (CN) .............................. 2011 1 057113

(51) Int. Cl.
*G01W 1/00*   (2006.01)
*G01W 1/02*   (2006.01)

(52) U.S. Cl.
CPC .. *G01W 1/02* (2013.01); *G01W 1/00* (2013.01)

(58) Field of Classification Search
None
See application file for complete search history.

(56) References Cited

U.S. PATENT DOCUMENTS

2014/0358442 A1* 12/2014 Akhlaq ................... G01W 1/02
                                                                    702/3

FOREIGN PATENT DOCUMENTS

CN         1967184 A      5/2007
CN      201044000 Y      4/2008
(Continued)

OTHER PUBLICATIONS

Zhang etal., An experimental & observational study on the electric effect of sandstorm, Chinese J. of Geophysics, Jan. 2004, V.47, No. 1, p. 47-53.
Zhang etal., Summary on wind tunnel experiement study of sandstorm electrification, Plateau Meteorology, Aug. 2002, V.21, No. 4, p. 402-407.

(Continued)

*Primary Examiner* — Andre Allen
(74) *Attorney, Agent, or Firm* — Jiwen Chen

(57) ABSTRACT

A real-time synchronous measurement system for multiple factors such as a wind-blown sand electric field, sand particle electrification and wind speed, comprising: a first support, a second support, a third support, and an electric field instrument disposed vertically in parallel. A 3D ultrasonic anemometer (4), a wind speed meter (3), a temperature and humidity detector (1), and a weather vane (2) are installed on and connected via data cables to the first support. A probe (7) of the electric field instrument is installed on the second support. A piezoelectric kinetic energy sensor (5) is installed on the third support. A data collector (6) is installed between and connected via data cables to the first support and the third support. A real-time sand particle mass-to-charge ratio instrument is further comprised. A computer (12) is installed between and connected via data cables to the second support and the real-time sand particle mass-to-charge ratio instrument. Through the combination of devices, comprehensive, synchronous, and frequent measurement of the wind-blown sand electric field, sand particle mass-to-charge ratio, sediment transport intensity and influences thereof such as the wind speed, wind direction, air temperature, and humidity is implemented. Therefore, the defects of the number of functions being small and poor synchronization in the prior art are overcome, so as to achieve the advantages of multiple functions and desirable synchronization.

5 Claims, 1 Drawing Sheet

(56) References Cited

FOREIGN PATENT DOCUMENTS

| CN | 101949980 A | 1/2011 |
|---|---|---|
| CN | 101995324 | 3/2011 |
| CN | 201828392 U | 5/2011 |
| CN | 202126274 U | 1/2012 |
| EP | 1162316 A1 | 12/2001 |

OTHER PUBLICATIONS

Huang etal., Research history, achievements & trend pn mechanism of aeolian teansport, Mechanics in Engineering, Aug. 2007, V.29, No. 04, p. 9-16.

Lu etal., An electrostatic dynamics model for wind-blow sand systems, Acta Physica Sinca, Nov. 2008, V.57, No. 11, p. 6939-6944.

* cited by examiner

REAL-TIME SYNCHRONOUS MEASURING SYSTEM FOR MULTIPLE FACTORS SUCH AS WIND-BLOWN SAND ELECTRIC FIELD, SAND PARTICLE CHARGING AND WIND SPEED

This is a U.S. national stage application of PCT Application No. PCT/CN2011/001492 under 35 U.S.C. 371, filed Sep. 2, 2011 in Chinese, claiming the priority benefit of Chinese Application No. 201110157113.9, filed Jun. 13, 2011, which is hereby incorporated by reference.

FIELD OF THE INVENTION

The present invention relates to technologies for detecting wind-blown sand flow three-dimensional (3D) electric field, sand particle charging, 3D wind speed, sediment transport intensity, temperature and humidity and the like and in particular relates to a real-time synchronous measuring system for measuring wind-blown sand flow 3D electric field, sand particle charging, 3D wind speed, sediment transport intensity, temperature and humidity and the like.

BACKGROUND OF THE INVENTION

Wind-blown sand electric field is an electric field which is formed from moving sand dust with a certain amount of charges in a wind-blown sand environment, and is higher than fine day atmosphere electric field by 2-3 magnitude orders. It will affect wind-blown sand flow intensity, communication, radar signal and the like. Moreover, the existence of dust in earth environment is an important factor for predicting temperature and season variation, and knowledge of wind-blown sand transport process under wind field is helpful to research on many other fields, such as atmospheric science, remote sensing technology, geographical science and the like. The sand particle static force, as a basic part of research on bed surface dust emission and dune movement, not only has important academic value but also is important to desertification and coast control. Therefore, wind-blown sand electricity study has attracted many scholars to conduct experimental and theoretical research on the generation mechanism of wind-blown sand electric field and the influence thereof on wind-blown sand motion.

However, people's knowledge on the wind-blown sand electric field and sand particle charging is limited due to the limitation of experimental instrument, means and the like. Measurement on wind-blown sand electric field is mainly vertical electric field single-factor measurement and measurement on sand particle charging is to determine an average mass-to-charge ratio of the sand particles depending on a ratio of the total charging to the mass of the collected sand particles over a certain period of time, but it cannot implement real-time synchronous measurement by effectively combining multiple factors such as wind-blown sand flow 3D electric field, sand particle charging, 3D wind speed, sediment transport intensity, temperature and humidity and the like. Because of lack of knowledge on relevancy and quantitative relation among the multiple factors such as wind-blown sand flow 3D electric field, sand particle charging, 3D wind speed, sediment transport intensity, temperature and humidity, deep understanding of wind-blown sand electric field and sand particle charging laws cannot be achieved.

Inventors find that the prior art has a defect that it cannot implement real-time synchronous measurement on multiple factors such as wind-blown sand flow 3D electric field, sand particle charging, 3D wind speed, sediment transport intensity, temperature and humidity and the like.

SUMMARY OF THE INVENTION

The present invention aims at, for the previous problems, providing a real-time synchronous measuring system for 3D electric field, sand particle charging, 3D wind speed, sediment transport intensity, temperature and humidity and the like, so as to achieve real-time synchronous measurement on multiple factors such as wind-blow sand flow under field condition.

To achieve the objective, the present invention adopts the following technical solution: a real-time synchronous measuring system for measuring multiple factors such as wind-blown sand electric field, sand particle charging and wind speed, comprises a first support, a second support and a third support disposed vertically in parallel, and further comprises an electric field instrument:

a 3D ultrasonic anemometer, a wind speed meter, a temperature and humidity detector, and a weather vane are installed on and connected via data cables to the first support;

a probe of the electric field instrument is installed on the second support;

a piezoelectric kinetic energy sensor is installed on the third support;

a data collector is installed between and connected via data cables to the first support and the third support;

a real-time sand particle mass-to-charge ratio measuring instrument is further included; and a computer is installed between, and connected via data cables to, the second support and the real-time sand particle mass-to-charge ratio measuring instrument.

Through the combination of the above devices, comprehensive, synchronous and frequent measurement of the wind-blown sand electric field, sand particle mass-to-charge ratio, sediment transport intensity and the influencing factors thereof such as wind speed, wind direction, air temperature and humidity are implemented. Therefore, the defects of less functions and poor synchronization in the prior art can be overcome, so as to achieve the advantages of multiple functions and desirable synchronization.

Preferably, the first support comprises a first base installed at the bottom, and a first vertical pillar vertically arranged on the first base:

the temperature and humidity detector is installed at the top end of the first vertical pillar; and the weather vane, the wine speed meter and the 3D ultrasonic anemometer are installed below the temperature and humidity detector.

Preferably, the second support comprises a second base installed at the bottom, and a second vertical pillar vertically arranged on the second base:

a plurality of sensing probes of the electric field instrument are installed on different heights of the second vertical pillar.

Preferably, the third support comprises a third base installed at the bottom, and a third vertical pillar vertically arranged on the third base;

a plurality of piezoelectric kinetic energy sensors are installed on different heights of the third vertical pillar.

Preferably, the measuring system further comprises a solar cell panel and a rechargeable battery.

BRIEF DESCRIPTION OF THE DRAWINGS

For a more complete understanding of the present invention, reference should now be made to the embodiment show in the accompanying drawing described below and should not be used to limit the present invention. In the drawings.

THE REFERENCE NUMBERS IN THE DRAWINGS ARE AS FOLLOWS

Figure 1:
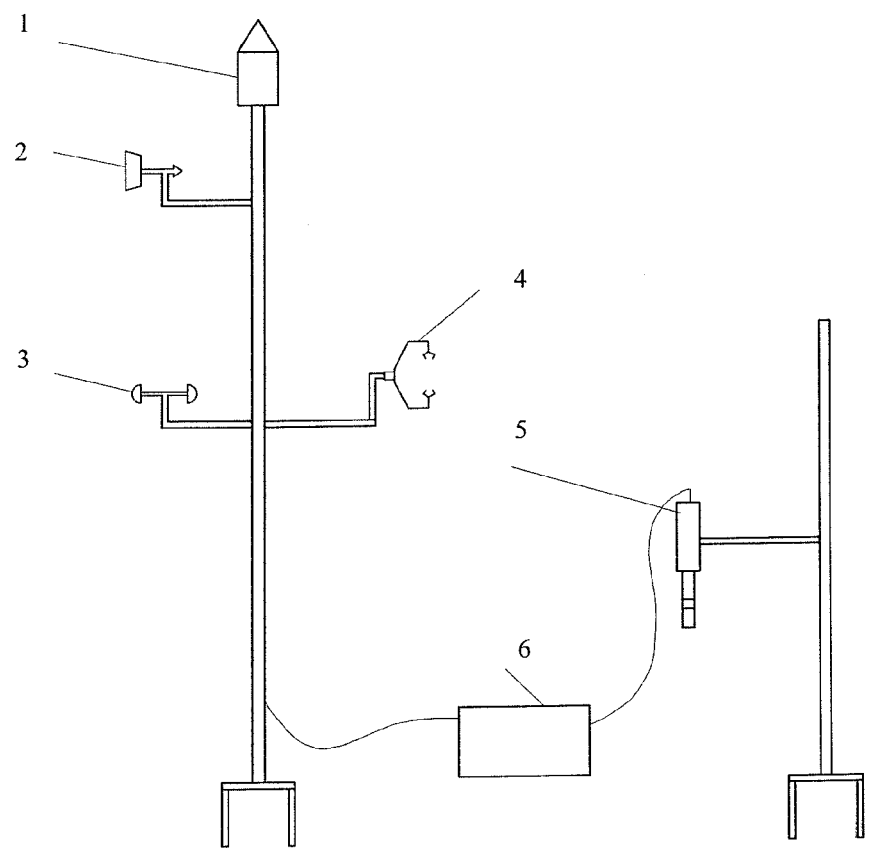
FIG. 1 is a structural schematic representation of a first support and a third support of a real-time synchronous detection system for multiple factors such as wind-blown electric field, sand particle charging and wind speed according to the present invention.
Figure 2:
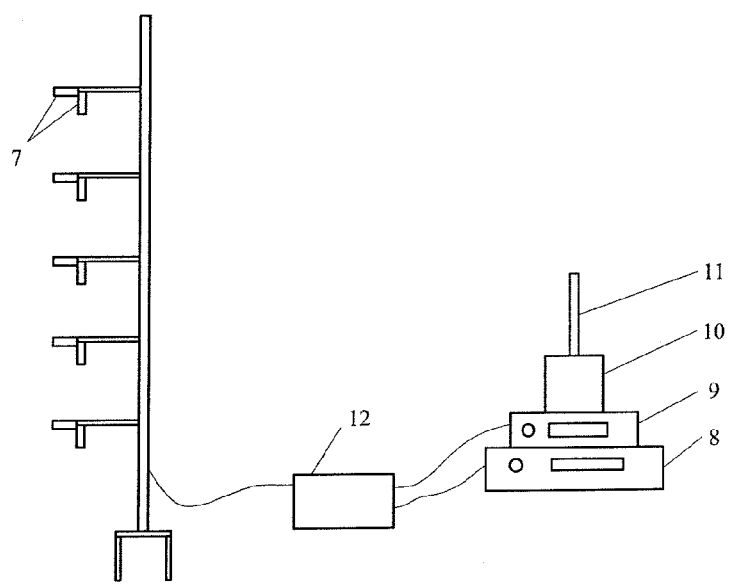
FIG. 2 is a structural schematic representation of a third support and a mass-to-charge ratio real-time measuring instrument of a real-time synchronous detection system for multiple factors such as wind-blown electric field, sand particle charging and wind speed according to the present invention.

1—temperature and humidity detector, 2—weather vane, 3—wind speed meter, 4—3D ultrasonic anemometer, 5—piezoelectric kinetic energy sensor, 6—data collector, 7—electric field instrument probe, 8—electrometer, 9—digital scale, 10—Faraday cylinder, 11—sand feeding pipe, 12—computer.

DETAILED DESCRIPTION OF PREFERRED EMBODIMENT

The technical scheme of the present invention will be described in conjunction with accompanying drawings and preferred embodiment hereinafter. It should be understood that the preferred embodiment described here is merely used to illustrate and explain the present invention, and are not used to limit the present invention. Temperature and humidity detector 1: for measuring the temperature and humidity of atmosphere;
Weather vane 2: for measuring wind direction variation;
Wind speed meter 3: for measuring wind speeds on different heights;
3D ultrasonic anemometer 4: for measuring 3D wind speed;
Piezoelectric kinetic energy sensor 5: for measuring sediment transport intensity of wind-blown sand flow;
Data collector 6: for collecting data of instruments on the first support and the third support;
Electric field instrument probe 7: for sensing a space electric field;
Electrometer 8: for measuring electric quantity of sand particles in the Faraday cylinder;
Digital scale 9: for measuring the mass of sand particles in the Faraday cylinder;
Faraday cylinder 10;
Sand feeding pipe 11: for collecting sand particles in the wind-blown sand flow, so that the sand particles can enter into the Faraday cylinder;
Computer 12: for recording wind-blown the sand charging and the mass measured by the electrometer and the digital scale as well as space electric fields sensed by each electric field instrument.

The above description is only the preferred embodiment of the present invention and is not intended to limit the present invention. The invention can have a variety of changes and variations for those skilled in the art. Any modification, equivalent substitution, improvement etc. which are made within the spirit and principle of the present invention should belong to the protection scope of the present invention.

The invention claimed is:

1. A real-time synchronous measuring system for multiple factors such as wind-blown sand electric field, sand particle charging and wind speed, comprising a first support, a second support and a third support disposed vertically in parallel, further comprising an electric field instrument, wherein:
   a 3D ultrasonic anemometer, a wind speed meter, a temperature and humidity detector, and a weather vane are installed on and connected via data cables to the first support;
   a probe of the electric field instrument is installed on the second support;
   a piezoelectric kinetic energy sensor is installed on the third support;
   a data collector is installed between, and connected via data cables to, the first support and the third support;
   a real-time sand particle mass-to-charge ratio instrument is further included; and a computer is installed between and connected via data cables to the second support and the real-time sand particle mass-to-charge ratio instrument.

2. The real-time synchronous measuring system for multiple factors such as wind-blown sand electric field, sand particle charging and wind speed according to claim 1, wherein:
   the first support comprises a first base installed at the bottom, and a first vertical pillar vertically arranged on the first base;
   the temperature and humidity detector is installed at a top end of the first vertical pillar;
   and the weather vane, the wine speed meter and the 3D ultrasonic anemometer are installed below the temperature and humidity detector.

3. The real-time synchronous measuring system for multiple factors such as wind-blown sand electric field, sand particle charging and wind speed according to claim 1, wherein:
   the second support comprises a second base installed at the bottom, and a second vertical pillar vertically arranged on the second base; and
   a plurality of sensing probes of the electric field instrument are installed on different heights of the second vertical pillar.

4. The real-time synchronous measuring system for multiple factors such as wind-blown sand electric field, sand particle charging and wind speed according to claim 1, wherein:
   the third support comprises a third base installed at the bottom, and a third vertical pillar vertically arranged on the third base; and
   a plurality of piezoelectric kinetic energy sensors are installed on different heights of the third vertical pillar.

5. The real-time synchronous measuring system for multiple factors such as wind-blown sand electric field, sand particle charging and wind speed according to claim 1, further comprising a solar cell panel and a rechargeable battery.

\* \* \* \* \*